July 17, 1956 E. W. VAUPEL 2,755,345
LINE INSULATION TESTING CIRCUIT
Filed June 3, 1953
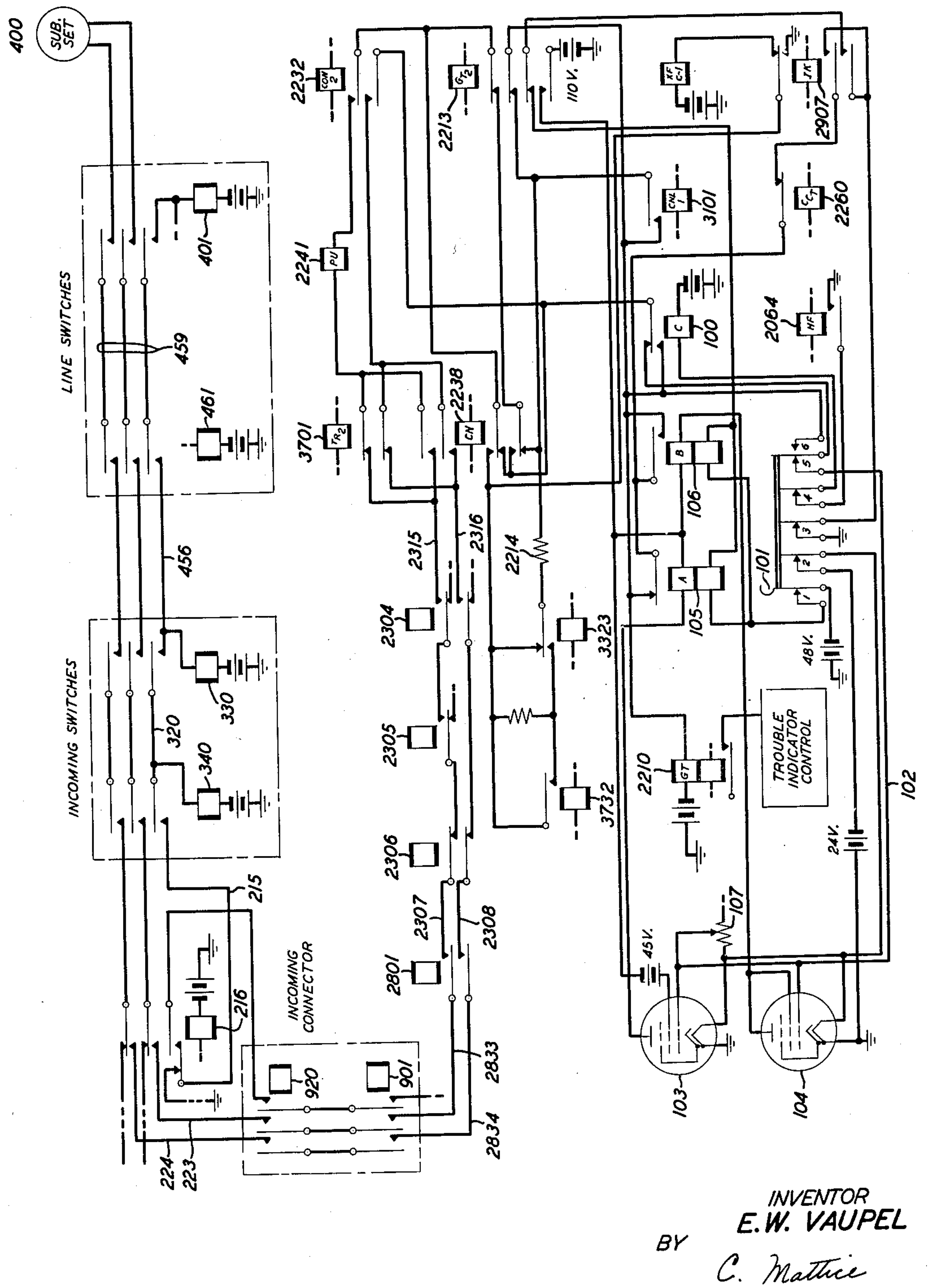
INVENTOR
E. W. VAUPEL
BY C. Mattice
ATTORNEY United States Patent Office 2,755,345

Patented July 17, 1956

2,755,345

LINE INSULATION TESTING CIRCUIT

Ernest Walter Vaupel, Whitestone, N. Y., assignor to American Telephone and Telegraph Company, a corporation of New York Application June 3, 1953, Serial No. 359,318

5 Claims. (Cl. 179—175.2)

This invention relates to telephone systems and has for its object to facilitate the maintenance of subscribers' lines. A more specific object of the invention is to test the insulation resistance of a line each time that the line is called.

The routine testing of subscribers' lines for low insulation resistance is a well-known procedure. Further, an additional test for the presence of a false battery is often made as a separate step in such routine testing.

In accordance with the present invention, means is provided to simultaneously test a line for low insulation resistance and for connection to a false battery potential.

A feature of the invention lies in the use of a pair of vacuum tubes and associated circuits so arranged that one tube is responsive to leakage to ground and the other tube is responsive to false battery potential. The response of either tube is effective to indicate a trouble condition on the tested line.

As a further feature of the invention this testing means is included in the common control circuit or marker of a cross bar system which is so arranged that each time it connects with a line, as a called line, the testing means is connected with the line. If either trouble condition exists, the marker is prevented from completing a connection with the called line.

These features of the invention will be more clearly understood from a consideration of the following description read in connection with the drawing which shows in schematic form a called subscriber's line and the terminating end of a connection therewith, together with a skeletonized showing of the marker circuits concerned with the present invention.

This drawing is based on the disclosure of Patent 2,232,371, granted to Dehn and Myers February 18, 1941, and reference is made to that patent for a complete disclosure of a marker in which the present invention may be employed. For convenience in referring to the Dehn et al. patent, the same reference numerals have been applied to the elements of the drawing as are used for the corresponding elements in the Dehn et al. drawing. The elements added in accordance with the present invention have been given designations between 100 and 199.

As set forth in the Dehn et al. patent, when a call has been extended to an incoming junctor, the incoming junctor is connected with an incoming sender in which the wanted line designation is registered. When the designation has been registered, the incoming sender is connected with a terminating marker through a marker connector and the designation is transmitted to the marker. As soon as the marker is connected with the sender, relay 2801 is operated.

Having received the wanted line designation, the marker connects with a number group circuit to obtain the location of the called line and then operates an incoming connector including relays 901 and 920 to obtain control of the incoming switches and the incoming junctor. As a result of the operation of the incoming link connector, check relay 2907 is operated. With relay 2907 operated, a circuit is closed from ground over the front contact of relay 2907, back contact of relay 3223, resistance 2214, middle lower contact of relay 2213 to battery through the upper winding of relay 2210. With relay 2210 operated, relay 216 in the incoming junctor is also operated. Relay 2907 also closes a circuit from battery over contact 1 of key 101 through the lower windings of relays 105 and 106, outer lower back contact of relay 2213, outer front contact of relay 2907 to ground over contact 3 of key 101. This circuit serves to thoroughly magnetize the cores of relays 105 and 106 preparatory to their use in the line test.

When the marker has received the location of the called line from the number group circuit it operates a line choice connector to obtain control of the line swtiches. The marker then selects and tests the wanted line and, if it is idle, tests for and selects an idle channel, after which it operates hold magnet 461 of the secondary line switch and hold magnet 330 of the secondary incoming switch followed by hold magnet 340 of the primary incoming switch. With relay 216 operated, the marker is connected with the talking conductors of the partially set-up connection over contacts 2 and 4 of relay 216 and contacts of relays 920 and 901 in the incoming connector circuit. The marker then tests this connection for freedom from ground and if the talking conductors through the switches are in the proper condition, relay 2305 operates in turn operating hold magnet 401 of the primary line switch completing the connection between the marker and the called line. With relay 2305 operated, relay 2304 is also operated. A continuity test is made as described in the Dehn et al. patent and, if the result of this test is satisfactory, relay 2232 is operated. Following the continuity test the marker sets the ringing control relays of the incoming junctor and checks the accuracy of such setting. If the check is satisfactory relay 2213 is operated.

The called line is now connected over contacts of the primary line switch, secondary line switch, secondary incoming switch, primary incoming switch, contacts of relay 216, contacts of relays 920 and 901 of the incoming connector circuit to conductors 2833 and 2834. With relays 2304, 2305 and 2232 operated, the tip conductor 2834 is extended over front contact of relay 2801, conductor 2308, back contact of relay 2306, front contact of relay 2304, conductor 2316, back contact of second trial relay 3701, front contact of relay 2232, back contact of relay 100, contact 5 of key 101 to conductor 102. The ring conductor 2833 is also connected over front contact of relay 2801, conductor 2307, back contact of relay 2306, front contact of relay 2305, front contact of relay 2304, conductor 2315, back contact of relay 3701, through the winding of relay 2241, front contact of relay 2232, back contact of relay 2238, back contact of relay 100 and contact 5 of key 101 to conductor 102. When relay 2213 operates, the energizing circuits through the lower windings of relays 105 and 106 are opened and plus 110-volt battery is connected to the upper windings of relays 105 and 106. Plus 110-volt battery is also connected in series with minus 45-volt battery to the screen grid of tube 103. The upper winding of relay 105 is connected to the plate of tube 103, while the upper winding of relay 106 is connected to the plate of tube 104. Relay 2213 also opens the energizing circuit for relay 2210.

The means for making the insulation resistance and false battery tests includes two vacuum tubes 103 and 104 and the two relays 105 and 106. Both tubes are shown as pentodes but a triode might be substituted for tube 104. In each tube the cathode and suppressor grid are connected together and to ground, while the control grid is connected to conductor 102 which is connected to the two conductors of the subscriber's line as previously described. In tube 104 the plate or anode and the screen grid are connected together and through the upper winding of relay 106 to plus 110-volt battery over a contact of relay 2213. The plate or anode of tube 103 is connected through the upper winding of relay 105 to the plus 110-volt source. The screen grid is also connected to the plus 110-volt source through a minus 45-volt source so that the plate has a potential of 45 volts above that of the screen grid. The heater elements are energized from a minus 24-volt source over contact 2 of key 110. This same source is connected through resistance 107 to the control grids of the two tubes to supply a normal bias. Resistance 107 is adjustable to determine the range of leakage resistance to be indicated, but for average conditions is 75,000 ohms.

When relay 2213 operates, the circuits through the upper windings of relays 105 and 106 are closed and the circuits through the lower windings are opened as well as the operating circuit for relay 2210. The normal plate current in tube 103 operates relay 105 but the normal plate current through tube 104 does not operate relay 106.

A high resistance ground will normally appear on the line conductors having a tendency to cause the control grids of the tubes to become positive, increasing the current flow through the tubes, this increase in current flow through relay 105 holding that relay operated. If the insulation resistance is sufficiently high, the increase will be insufficient to operate relay 106, but if the insulation resistance is in the range to be detected, the increase in current flow will also cause the operation of relay 106. With relay 106 operated, a circuit is closed from battery through the upper winding of relay 2210, contact of relay 106, contact of relay 2260, contact of relay 2907, contact 3 of key 101 to ground, holding relay 2210 operated. As described in detail in the above-mentioned Dehn et al. patent, the failure of relay 2210 to release blocks the completion of the call and causes a trouble indication to be set up.

On the other hand, if a false battery potential is present on the line, the control grids become negative, reducing the current flow through the tubes. Therefore relay 106 cannot operate and relay 105 releases. With relay 105 released, a circuit is closed from battery through the upper winding of relay 2210, back contact of relay 105, contact of relay 2260, contact of relay 2907, contact 3 of key 101 to ground, preventing the release of relay 2210 to block the completion of the call.

Lines leading to a P. B. X present a different condition from individual lines and are ordinarily given a loop test by the marker. When such a line is identified by the number group circuit, it causes the operation of relays 2064 and 2238 as described in the Dehn et al. patent. With relay 2064 operated, a circuit is closed from ground over a contact of relay 2064, contact 4 of key 101 to battery through the winding of relay 100, operating relay 100. With relay 2238 operated, when relay 2213 operates, the tip and ring conductors are disconnected from one another, the ring conductor being extended to ground at the front contact of relay 2907 while the tip conductor is connected to the ground test lead. With relay 100 operated, this lead is disconnected from the tube circuit and is extended to the upper winding of relay 2210 so that the ground test is made in the usual manner.

If for any reason it is not desired to use the insulation testing equipment, key 101 will be opened. At its contact 1 the operating circuit for relays 105 and 106 is opened; at its contact 2 the heater circuit for tubes 103 and 104 is opened; at its contact 3 ground is disconnected from the armatures of relays 105 and 106; at its contact 4 the circuit of relay 100 is opened; at its contact 5 the line test circuit is disconnected from the control grids of tubes 103 and 104; and at its contact 6 the line test circuit is extended to the upper winding of relay 2210 so that the marker makes the ground test in the usual manner.

Relay 2260 is operated when it is desired to cancel the continuity test and, when so operated, disconnects ground from the armatures of relays 105 and 106 to render them ineffective. Relay 3101 is used when it is necessary to set the incoming junctor to give an overflow signal and holds relay 2210 operated.

What is claimed is:

1. In a telephone system, subscribers' lines subject to leakage to ground and connection with false battery potential, means for testing said lines comprising a pair of vacuum tubes, each tube having an input electrode and an output circuit, means to connect one of said lines with said testing means, a relay in the output circuit of each of said tubes, control circuits for one of said tubes to render said one tube responsive to leakage to ground on said connected line to operate one of said relays and control circuits for the other of said tubes to normally operate the other one of said relays and to render said other tube responsive to false battery potential on said connected line to release said other relay, and means responsive to the operation of said one relay or to the release of said other relay to indicate a trouble condition on said connected line.

2. In a telephone system, subscribers' lines subject to leakage to ground and connection with false battery potential, means for testing said lines comprising a pair of vacuum tubes, each tube having a cathode, an anode and a control grid, one of said tubes having an auxiliary grid, a bias voltage connected to the control grids of both tubes, an auxiliary voltage connected to said auxiliary grid, a first relay connected to the anode of said one tube and normally operated by the current flow through said first tube, a second relay connected to the anode of said other tube and normally non-operated, said tubes responsive to a predetermined leakage to ground on said connected line to hold said one relay operated and operate said second relay, said tubes responsive to a false battery potential on said connected line to release said first relay and prevent the operation of said second relay, and means responsive to the operation of said second relay or to the release of said first relay to indicate a trouble condition on said connected line.

3. In a telephone system, called lines, a control circuit for controlling the establishment of connections with said called lines, means for connecting said control circuit with one of said called lines, means in said control circuit for testing the talking conductors of said one line for ground, electronic means in said control circuit for simultaneously testing the talking conductors of said lines for low leakage resistance and false battery potential, and means for alternatively connecting said one line with said ground test means or said electronic test means.

4. In a telephone system, called lines, a control circuit for controlling the establishment of connections with said called lines, means for connecting said control circuit with one of said called lines, means in said control circuit for testing the talking conductors of said one line for ground, electronic means in said control circuit for simultaneously testing the talking conductors of said lines for low leakage resistance and false battery potential, said ground test means being normally effective, and manually controlled means for disabling said ground test means and rendering said electronic test means effective.

5. In a telephone system, called lines of a plurality of classes, a control circuit for controlling the establishment of connections with said called lines, class indicating means in said control circuit, means for connecting said control circuit with one of said called lines, means in said control circuit for testing the talking conductors of said one line for ground, electronic means in said control circuit for simultaneously testing the talking conductors of said lines for low leakage resistance and false battery potential, said ground test means being normally effective, manually controlled means for disabling said ground test means and rendering said electronic test means effective, and means under the control of said class indicating means to disable said electronic test means and render said ground test means effective.

References Cited in the file of this patent

UNITED STATES PATENTS

| | | |
|---|---|---|
| 2,393,236 | Corey et al. | Jan. 22, 1946 |
| 2,550,820 | Kessler | May 1, 1951 |